June 14, 1960     R. L. KITRELL     2,941,067
WELDING APPARATUS AND FLEXIBLE DAM FOR USE THEREWITH
Filed May 7, 1958
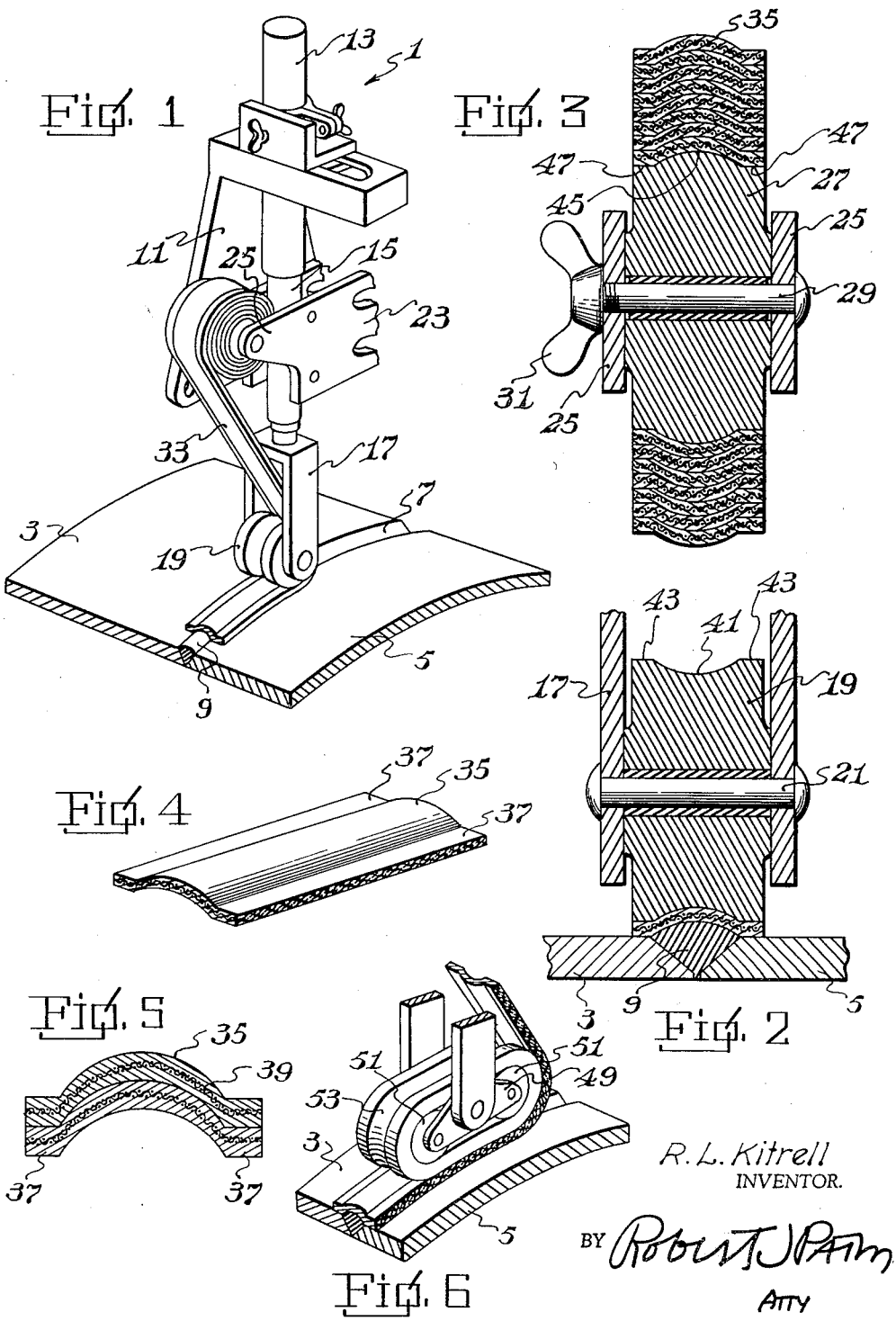
R. L. Kitrell
INVENTOR.

United States Patent Office 2,941,067
Patented June 14, 1960

2,941,067
WELDING APPARATUS AND FLEXIBLE DAM FOR USE THEREWITH

R. L. Kitrell, 5100 E. 17th St., Tulsa, Okla.

Filed May 7, 1958, Ser. No. 733,570

15 Claims. (Cl. 219—125)

This application is a continuation-in-part of copending application Serial No. 711,599, filed January 28, 1958, now Patent No. 2,906,851, dated Sept. 29, 1959.

The present invention relates to welding apparatus, and more particularly to welding apparatus adapted to form non-horizontal welds and having provision for covering the molten weld with a dam to retain the molten material in place in the weld.

In the assembly of great lengths of pipe such as pipe lines, it is customary to assemble the pipe line from a plurality of relatively short pipe sections laid end to end. The contiguous ends of each adjacent pair of sections are beveled and butt welded. Since the work cannot be rotated, the welding operation requires welding from literally every angle from straight down to straight overhead.

In the past, it has been customary to reduce the amount of welding that must be done in the ditch of a pipe line by welding together two lengths of pipe while they are still on the surface of the ground, a procedure known in this art as "double-jointing." The double-joint is then lowered into the ditch and welded to that portion of the pipe line which has already been laid. It has been necessary for welders to get down into the ditch to work. Naturally, the ditches are not dug much larger than is necessary, so that the welder has been forced into dangerously close contact with his work. The difficulties and dangers of welding in such confined quarters will be especially clear when it is realized that a large proportion of each weld is overhead or vertical work, with the result that there is a good deal of dripping and spatter.

In addition to the dangers involved, it will also be realized that the loss of so much metal from the weld inevitably leaves a weld which is undesirably weak. Furthermore, the irregularities in the weld introduced by such loss of weld metal set up points of galvanic action after the weld has been buried, and this results in excessive localized corrosion.

Broadly, in addition to the provisions of the above identified copending application, the present invention solves the problems of the prior art in this field by providing a flexible welding dam which is pre-formed to have an arcuate cross-sectional configuration such that a shape is imparted to the finished weld which will have the greatest possible strength characteristics.

Accordingly, it is an object of the present invention to provide apparatus for welding joints between contiguous members which is adapted to prevent the loss of molten metal from the weld.

Another object of the present invention is the provision of apparatus for welding joints between contiguous members by use of a flexible welding dam, in which provision is made for imparting maximum strength to the completed weld.

The invention also contemplates provision of a flexible welding dam for use with apparatus for welding joints between contiguous members, the dam being adapted to impart the greatest possible strength to the completed weld.

Finally, it is an object of the present invention to provide apparatus for welding joints between contiguous members and flexible welding dams for use with such apparatus, which will be relatively simple and inexpensive to manufacture, easy to adjust and to operate at high speeds, and safe, rugged and durable in use.

Other objects and advantages of the present invention will become apparent from a consideration of the following description, taken in conjunction with the accompanying drawing, in which:

Figure 1 is a fragmentary perspective view of apparatus according to the present invention, showing the same in use in connection with a pipe line;

Figure 2 is an enlarged fragmentary cross-sectional view of the presser member and its associated structure;

Figure 3 is a view similar to Figure 2 but showing the tape-carrying spool;

Figure 4 is a fragmentary perspective view of a portion of flexible welding dam according to the present invention;

Figure 5 is an enlarged cross-sectional view of two layers of flexible welding dam according to the present invention and showing the nesting relationship thereof; and Figure 6 is a fragmentary view similar to a portion of Figure 1 but showing another embodiment of the presser member.

Referring now to the drawings in greater detail, there is shown generally at 1 an apparatus for welding joints between contiguous aligned cylindrical pipe sections 3 and 5 having beveled contiguous edges 7 for the reception and retention of a weld 9 therebetween. The apparatus is supported for revolution in either direction about the common axis of pipe sections 3 and 5 by means of the structure illustrated and described in copending application Serial No. 711,599, of which the present application is a continuation-in-part, this structure being incorporated in the present application by reference so as to avoid useless repetition of the disclosure thereof.

There is thus provided a carriage including a bracket 11 on which is adjustably mounted a cylindrical barrel 13 within which is disposed for radial reciprocation a shaft 15 spring urged radially inwardly, all as described in the above identified copending application. A yoke 17 is carried by the radially inner end of shaft 15 and carries between its legs a presser member comprising a roller 19 mounted for rotation in yoke 17 on pin 21.

As also in the copending application, a pair of flat parallel plates 23 is secured in unitary assembly with and on opposite sides of shaft 15 and forms at one end a support for a welding electrode and electrode holder (not shown). At their other ends, plates are provided with ears 25 between which a spool 27 is mounted for rotation on a bolt 29 extending through ears 25 and carrying at one end a detachable wing nut 31 by which the spool assembly is maintained in assembled relationship.

Again as in the copending application, a flexible welding dam is provided, comprising an elongated strip 33 wound from one end on spool 27 in a plurality of turns and extending from spool 27 between roller 19 and the joint to be welded.

As thus far broadly recited, the structure and function of the device are the same as in the recited copending application. With barrel 13 properly adjusted as therein described, the device is run up about half the joint to weld in one direction, reversed and run back down and then back up in the other direction to weld the other half of the joint, the welding dam serving to retain the weld metal in place until solidification and itself remaining in place as it is payed out from the spool and applied beneath the presser member until the dam is finally removed from the completed weld.

Essentially, the present invention is an improvement over that of the copending application in that means are provided for imparting to the completed weld that shape which will have the most desirable strength characteristics. As is well known, the ideal weld shape has in cross section a configuration somewhat similar to that of a segment of a round pie, that is, it has angularly related straight sides corresponding to the inclination of the beveled edges and is bridged across its outer surface by a convexly arcuate outer surface, as best seen in Figure 2. Various attempts have in the past been made to impart this desirable shape to the weld; for example, in Meyer et al. United States Patent No. 2,677,036, April 27, 1954, a device is disclosed in which a resiliently compressible flexible welding dam is pressed against a weld area by means of a concavely grooved presser member, with the thought that the weld metal will shape the adjacent surface of the dam to a curvature complementary to that of the presser member. For a given welding speed and a given weld metal and a given composition and thickness of metallic members to be welded together, it is possible to select a welding dam of such a composition that it will in fact perform the intended function disclosed in the Meyer patent; but any variation in welding speed or any of the other variables listed above requires that a different welding dam be provided, lest on the one hand the dam forces the melt from the weld or on the other hand shape the weld altogether to shape the weld.

Essentially, the distinction of the present invention over this and related prior art is that the flexible welding dam of the present invention is pre-formed to the desired final weld shape and has a stiffness such that it retains that shape when unsupported. Thus, strip 33 has permanently a cross-sectional configuration best seen in Figure 5, which includes an arcuate mid-portion 35 the opposite faces of which are defined by segments of circles of equal radius. The cross-sectional configuration of strip 33 is also characterized by a pair of straight aligned end portions 37 disposed one on each side of mid-portion 35. As seen in Figure 4, the cross-sectional configuration of the strip is uniform throughout the length of the strip, so that arcuate mid-portion 35 of the cross-sectional contour of the strip represents a partially cylindrical longitudinally extending central portion of the strip while straight end portions 37 of the cross-sectional contour represent uniplanar edge portions extending longitudinally of each side edge of the strip.

The flexible welding dam of the present invention may be woven or matted glass fiber or asbestos fiber or other flexible heat-resistant material. Since the diameter of the filaments of glass fiber is subject to wide variation, it should be noted that a suitable glass filament diameter is 0.0002 to 0.00025 inch. Pre-forming is accomplished between presser rollers having peripheral contours complementary to the contours of the opposite faces of the final strip 33, which is to say that the peripheral contours of the forming rollers are complementary to each other since the cross-sectional contours of the opposite sides of the strips are congruent. This congruency of the opposite sides of the strip permits winding of the strip on spool 27 with the turns thereof nested in intimate contact with each other.

Suitable sizing agents are starch, natural gums, vegetable or animal glues, gelatin, casein, tallow and waxes. In commercial sizing operations as heretofore practiced, it has been customary to partially sulfate certain of these agents so as to facilitate subsequent removal by washing; but since the sizing of the welding dam of the present invention need never be removed this step is unnecessary. Various synthetic resins are also useful for stiffening the dam, and in order to enable persons skilled in this art to practice the invention, the following illustrative example is given:

A tape of woven glass fiber as described above is immersed in an impregnating solution formed of one part by weight of polymethylmethacrylate sold commercially by Rohm & Haas as "Plexiglass Y-100" or by Du Pont as "Lucite HG-40" dissolved in 45 parts by weight of ethylene dichloride, the solution soaking entirely through the tape. The wet tape is then introduced between forming rollers as described above which are heated and are maintained at a temperature of 200° F. Depending on the thickness of the tape and the speed of travel through the rollers, one pass through the rollers will suffice sufficiently to drive off the highly volatile solvent. For thicker tapes or higher passage speed, the tape may be fed through the rollers a plurality of times or a plurality of pairs of rollers may be provided through which the tape passes sequentially. It is not necessary that the tape be thoroughly dried by passage through the rollers, as the last increment of solvent will dissipate in the air or by oven drying.

When stiffening agents in the nature of sizing agents are used, no great care need be taken that they be heat-resistant. Despite the fact that the weld metal with which the stiffened dam comes into contact is at very high temperature, even those sizing agents having relatively low melting points will nevertheless continue to impart to the dam a desirable stiffness throughout solidification of the weld metal, as the fibrous material of the dam itself serves as a very good insulator.

Another form of stiffening agent for the welding dam is shown in Figure 5, in which a fine metal woven wire mesh 39 is embedded in strip 33. The wire of the mesh may be formed from copper or steel or other material which can be readily bent to form, the desired characteristics of the material being that it have stiffness without great resilience or brittleness. Of course, the pre-forming operation for a dam having embedded wire mesh consists of passing the strip through the forming rollers described above.

The presser member comprising roller 19 serves as a backup member for pressing strip 33 against the weld. The axis of shaft 15 passes through and intersects the axis of pin 21 on which roller 19 is rotatably mounted, and hence the pressure exerted by the presser member is directed radially inwardly against strip 33 at its point of tangency with pipe sections 3 and 5. Roller 19 has an arcuate central peripheral groove 41 thereabout which is bounded on its opposite sides by portions of the periphery of roller 19 comprising a pair of coaxial aligned cylindrical edge portions 43. The cross-sectional contours of the periphery of roller 19 in all planes which include the axis of the roller are complementary to the cross-sectional contours of the welding dam so that the dam is not deformed upon application to the weld. Instead, groove 41 of roller 19 presses mid-portion 35 of strip 33 into contact with the weld metal to form the weld metal to the desired shape, while cylindrical edge portions 43 of the peripheral contour of roller 19 press the edge portions of strip 33 corresponding to the straight end portions 37 of the cross-sectional configuration thereof against those cylindrical portions of pipe sections 3 and 5 which are immediately adjacent beveled edges 7. In this way, the thrust of the presser member is borne by the welding dam securely to press the dam against the weld and the members to be welded but without deforming the dam and hence without altering the desired shape of the weld as predetermined by the pre-formed contour of the dam. It should also be noted that the self-supporting configuration of the dam assures that once roller 19 has passed on therebeyond, the dam will not flex to alter the shape imparted to the weld despite the fact that it is no longer backed up by roller 19. This enables the use of no backup member other than roller 19, which in turn permits use of the device in connection with welds of various contours. This last feature is a remarkable advance over the prior art, in which it had been necessary to provide backup members of a contour corresponding closely to that of the weld longitudinally of the weld, which in turn necessitated a change of backup members every time the longitudinal shape of the weld changed.

Spool 27 turns fairly freely on its mounting to pay out the welding dam to roller 19. In order accurately to hold the dam in wound relationship on the spool, spool 27 is provided with a convexly peripherally arched mid-portion 45 thereabout which is bounded on either side by a pair of coaxial aligned cylindrical edge portions 47. Over-all, the peripheral contour of spool 27 is complementary to the pre-formed contour of strip 33 so that all turns of strip 33 including the innermost nest snugly and firmly on spool 27 and on each other. In the illustrated embodiment, roller 19 and spool 27 turn in opposite directions because strip 33 is wound on spool 27 in a direction such that will not have interference with yoke 17. Obviously, however, if a portion of yoke 17 were cut away or ears 25 made longer, strip 33 could be wound in the opposite direction on spool 27 or spool 27 reversed in its bearings. In this latter case, roller 19 and spool 27 would turn in the same direction upon welding movement, and instead of being convexly peripherally arched, mid-portion 45 of spool 27 would be concavely peripherally depressed in the manner of groove 41 of roller 19. Hence, the essential feature of mid-portion 45 of spool 27 is merely that it have a peripheral curvature, whether concave or convex, in all planes which include the axis of rotation.

Finally, an embodiment alternative to the form of roller 19 as seen in Figure 1 is shown in Figure 6, in which yoke 17 carries pivotally at and between its radially inner ends a pair of plates 49 which in turn rotatably carry between their ends a pair of rollers 51 on which is trained an endless flexible belt 53 having the same cross-sectional peripheral contour as roller 19. Belt 53 may for example be of a silicone rubber which need not withstand the welding temperatures as it is insulated by strip 33.

In view of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the invention as defined by the appended claims.

What is claimed is:

1. In apparatus for welding joints between contiguous members comprising a carriage and means mounting the carriage for movement along a joint to be welded between contiguous members, the improvement comprising a concavely grooved presser member mounted on the carriage, a spool rotatably mounted on the carriage, and a length of welding dam in the form of an elongated strip having an arcuate cross-sectional configuration complementary to the concavity of the presser member, the dam being flexible but having a degree of stiffness such that said cross-sectional configuration is maintained when the dam is unsupported, the dam being wound from one end on the spool in a plurality of turns and extending from the spool between the presser member and the joint to be welded.

2. The structure claimed in claim 1 the spool having a peripheral curvature in all planes which include its axis, the arcuate cross-sectional configuration of the dam being complementary to said curvature of the spool.

3. The structure claimed in claim 1 said cross-sectional configuration of the dam being uniform throughout the length of the dam.

4. For use with apparatus for welding joints between contiguous members, a spool, and a welding dam in the form of an elongated strip having an arcuate cross-sectional configuration, the dam being flexible but having a degree of stiffness such that said cross-sectional configuration is maintained when the dam is unsupported, the dam being wound from one end on the spool in a plurality of turns.

5. The structure claimed in claim 4, the spool having a peripheral curvature in all planes which include its axis, the arcuate cross-sectional configuration of the dam being complementary to said curvature of the spool.

6. The structure claimed in claim 4, said cross-sectional configuration of the dam being uniform throughout the length of the dam.

7. For use with apparatus for welding joints between contiguous members, a spool, and a welding dam in the form of an elongated strip having a cross-sectional configuration characterized by an arcuate mid-portion and a pair of straight aligned end portions one on each side of the mid-portion, the dam being flexible but having a degree of stiffness such that said cross-sectional configuration is maintained when the dam is unsupported, the dam being wound from one end on the spool in a plurality of turns.

8. The structure claimed in claim 7, the spool having a peripheral curvature in all planes which include its axis, the arcuate mid-portion of the cross-sectional configuration of the dam being complementary to said curvature of the spool.

9. The structure claimed in claim 7, said cross-sectional configuration of the dam being uniform throughout the length of the dam.

10. In apparatus for welding joints between contiguous members comprising a carriage and means mounting the carriage for movement along a joint to be welded between contiguous members, the improvement comprising a concavely grooved presser member mounted on the carriage, and a length of welding dam in the form of an elongated strip having an arcuate cross-sectional configuration complementary to the concavity of the presser member, the dam being flexible but having a degree of stiffness such that said cross-sectional configuration is maintained when the dam is unsupported, the dam being wound from one end in a roll carried by the carriage and having a plurality of turns, the dam extending from the roll between the presser member and the joint to be welded.

11. The structure claimed in claim 10, said cross-sectional configuration of the dam being uniform throughout the length of the dam.

12. For use with apparatus for welding joints between contiguous members, a welding dam in the form of an elongated strip having an arcuate cross-sectional configuration, the dam being flexible but having a degree of stiffness such that said cross-sectional configuration is maintained when the dam is unsupported, the dam being wound from one end in a roll having a plurality of turns.

13. The structure claimed in claim 12, said cross-sectional configuration of the dam being uniform throughout the length of the dam.

14. For use with apparatus for welding joints between contiguous members, a welding dam in the form of an elongated strip having a cross-sectional configuration characterized by an arcuate mid-portion and a pair of straight aligned end portions one on each side of the mid-portion, the dam being flexible but having a degree of stiffness such that said cross-sectional configuration is maintained when the dam is unsupported, the dam being wound from one end in a roll having a plurality of turns.

15. The structure claimed in claim 14, said cross-sectional configuration of the dam being uniform throughout the length of the dam.

References Cited in the file of this patent
UNITED STATES PATENTS 2,673,916    Meyer _____ Mar. 30, 1954